Patented Feb. 21, 1933

1,898,371

UNITED STATES PATENT OFFICE

OTIS HUTCHINS, OF NIAGARA FALLS, NEW YORK, ASSIGNOR TO THE CARBORUNDUM COMPANY, OF NIAGARA FALLS, NEW YORK, A CORPORATION OF PENNSYLVANIA

SEPARATION OF GRAIN PARTICLES FROM A BONDED MASS

No Drawing.     Application filed October 7, 1930. Serial No. 487,092.

This invention relates to the recovery of granular particles from aggregates in which said granular material is held or bonded by a material of less toughness than the granular material itself. More particularly, it relates to a method of disintegrating bonded refractory or abrasive masses whereby separation of the principal granular material from the bond and other contaminating materials is effected with little loss and high concentration of the principal granular material.

Refractory shapes generally are made of relatively coarse refractory grains and a small amount of fine material that sinters or fuses when heated to high temperatures. The fine material used as the binder usually is of different chemical composition from that of the principal refractory material and frequently is a clay or combination of clays, and since the refractoriness of an article generally is lowered by the presence of foreign materials it becomes necessary to thoroughly remove this binding material and any other foreign material that may have been absorbed by the refractory shape in use, if the refractory grains are to be used again.

The desirability of reclaiming the granular material from scrap bonded refractories, or abrasives, used or unused, is brought about by the fact that the cost of the granular material is high. Moreover, the reclaimed granular material can be used again and again if it is freed from foreign material each time.

Attempts have been made in the past to reclaim refractory or abrasive grain from bonded articles by crushing and washing, but the results have not been satisfactory because either the degree of purification was insufficient or the chemical treatment used rendered the cost excessive.

In the present process the granular material is recovered in a purified condition without material reduction in the size of the grain particles. The process utilizes the difference in the toughness of the granular material, such as silicon carbide, fused alumina, zirconium oxide or zirconium silicate, and the binder, such as fused clay, or the absorbed impurity, such as furnace slags. The bond and the attached slag, both of which are vitreous, are not as tough as the refractory or abrasive grain and are broken away from the granular material by impacts of a magnitude smaller than that required to break the refractory or abrasive grains. Moreover, the grains have a unit crushing strength greater than that of the bond so that they will sustain a weight that crushes the bond and reduces it to a fine powder. Having thus reduced the bond to a relatively fine state of subdivision without materially crushing the refractory granules, separation is effected by screening out the finer material.

Ball or pebble mills usually are operated at such a speed that the balls or pebbles are carried, by the action of centrifugal force, to the top of the mill and then dropped onto the material at the bottom of the mill. In this way the material therein is crushed by the impact of the balls or pebbles and the efficiency of the mill is at its maximum. Rotation of the mill at a lower speed permits the balls or pebbles to drop before they reach the top and the speed may be reduced to such a point that the balls or pebbles will be carried only high enough to cause them to roll over the material in the mill. The efficiency of the mill, considered from the standpoint of reduction in size of the particles of material, is low under these conditions, but I have found that such operation causes the more friable bond or slag to be reduced to fines while the abrasive or granular material is not materially reduced in size. This is not the case when the mill is operated at its most efficient speed, for then the granular material becomes crushed.

In practicing my invention I operate the ball or pebble mill at such a speed that bonded material is given what I term a "mulling" treatment; that is, I operate the mill at such a speed that the balls or pebbles are carried only to such a point that they cause the bond or slag to be worn off the granular material and reduced to fines. While there may be some impact of the balls or pebbles on the material, the action is principally one of attrition. Whatever impact is produced is of a magnitude too small to materially crush the granular material.

Different materials require different degrees of treatment. The optimum treatment for any given material may be determined by screen analysis of samples taken at intervals during the treatment. For example, I have found it desirable in establishing the degree of treatment in one case of silicon carbide refractories containing approximately 50% silicon carbide to take samples at 15 minute intervals and determine the amount of silicon carbide in the portion remaining on a 97 mesh screen. When the silicon carbide content of the portion too coarse to pass through a 97 mesh screen reached approximately 80% I removed the material from the mill and screened out and discarded the portion finer than 97 mesh. This example is given for the purpose of illustration and is not intended to limit my process to the figures given.

After I have secured optimum separation of grain from bond and slag by reducing the undesirable material to fines and removing the same by screening, I subject the coarse material to further treatment in the mill. By interrupting the mulling operation to remove the fines I secure greater elimination of the undesirable material because the fine material, if not removed, interferes with the attrition.

After I have repeated the mulling and screening of the material the desired number of times, I may wash out the remaining loose particles of bond and slag with water, dry the granular material, and may thereafter remove the magnetic material with a magnetic separator. I have found that by this method of treatment refractory grain containing less than ten per cent impurities can be recovered from bonded material containing approximately fifty per cent by weight of said granular refractory material.

If the scrap material is in the nature of bricks, wheels and molded pieces, such material can first be reduced to a proper size for introduction into a ball mill by a process of crushing.

While I have described my process with particular reference to the treatment of bonded silicon carbide in a ball or pebble mill, my invention is not limited to this material nor to the use of that apparatus. Other forms of apparatus adapted to disintegrate the foreign material without materially crushing the granular material may be used.

I claim:

A method of recovering silicon carbide from refractory admixtures of silicon carbide and vitrified frangible bonding material of less toughness, which comprises mulling bonded masses of said refractory mixture to reduce the impurities to a fine state of subdivision, removing the finer fractions by screening, remulling the partially purified product, removing the finer material by washing, and subjecting the resultant product to a process of magnetic separation.

In testimony whereof I have hereunto set my hand.

OTIS HUTCHINS.